May 10, 1960 A. R. HOWELL ET AL 2,936,155
RESILIENTLY MOUNTED TURBINE BLADES
Filed Dec. 4, 1952 3 Sheets-Sheet 1
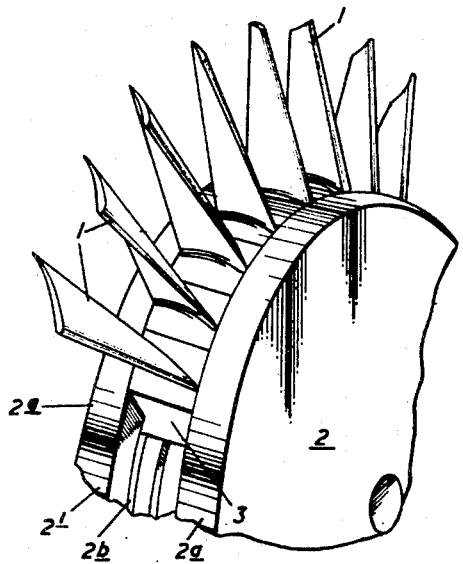
Fig. 1.
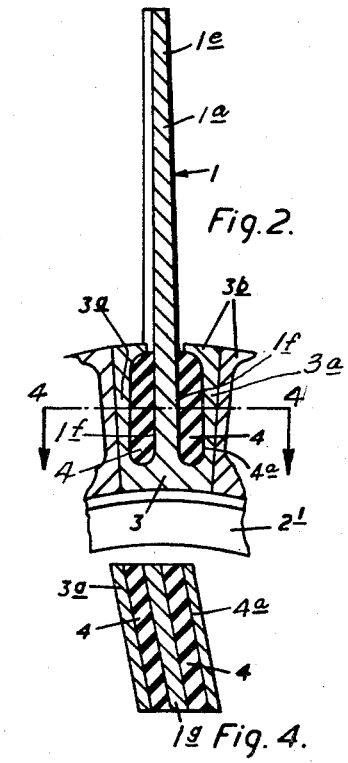
Fig. 2.
Fig. 4.
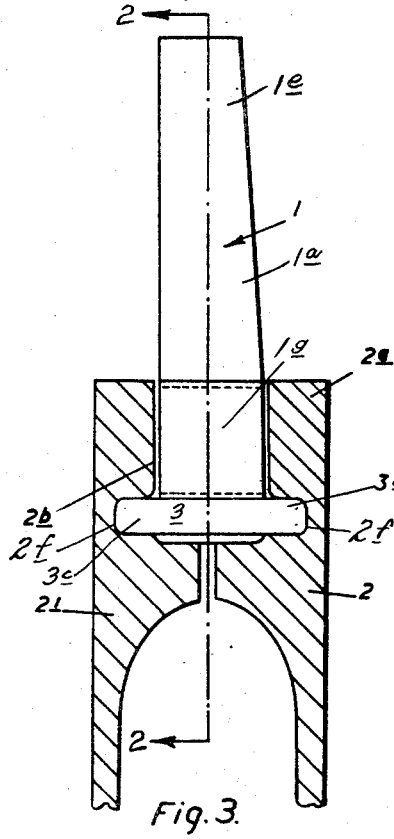
Fig. 3.
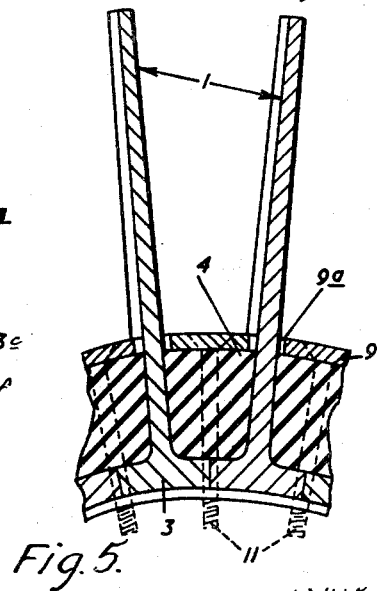
Fig. 5.
INVENTORS
ALUN RAYMOND HOWELL
AND LEONARD ISLIP
BY
his Attorneys INVENTORS
ALUN RAYMOND HOWELL
AND LEONARD ISLIP
BY
Attorneys

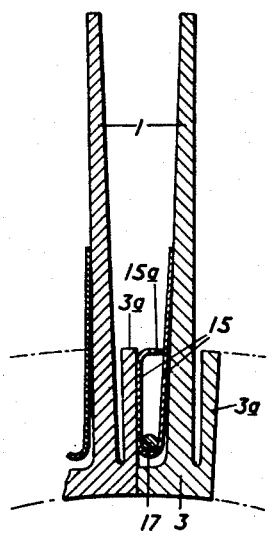 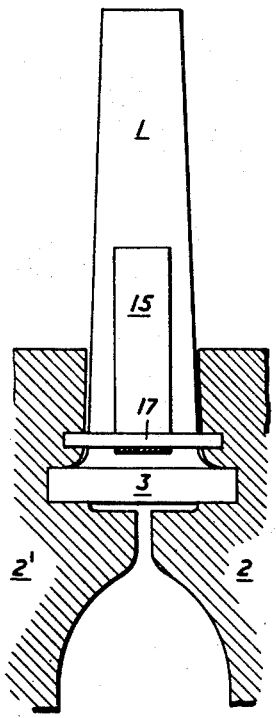 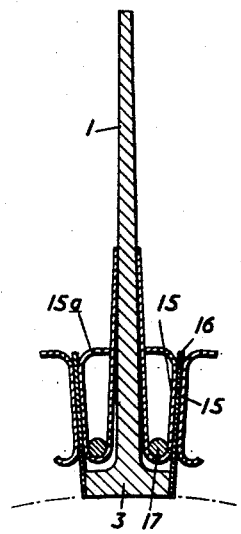
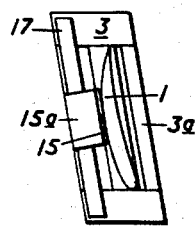 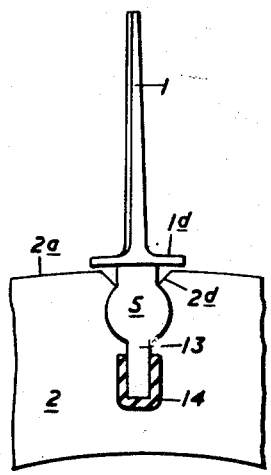 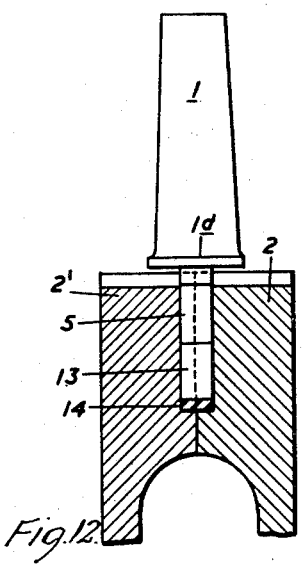

United States Patent Office 2,936,155
Patented May 10, 1960

2,936,155

RESILIENTLY MOUNTED TURBINE BLADES

Alun Raymond Howell and Leonard Islip, Cove, Farnborough, England, assignors to Power Jets (Research and Development) Limited, London, England, a British company Application December 4, 1952, Serial No. 324,027

Claims priority, application Great Britain December 10, 1951

7 Claims. (Cl. 253—77)

This invention relates to elastic fluid turbines and to turbine-bladed compressors but is more particularly applicable to the latter. Vibrations set up in the blades of such machines under the action of the dynamic forces thereon can give rise to dangerously high stresses and possible fracture of blades. The object of the present invention is to provide a construction which will afford very considerable damping of the blades.

According to the invention, a damped blade for a turbo-machine comprises a blade stem, a root base integral therewith, a root projection integral with said root base and extending radially therefrom in spaced relation to the blade stem to define a gap between the stem and said root projection and a resilient vibration damping member in said gap bearing against said root projection and said blade stem. The resilient vibration damping member may be a mass of rubbery material, i.e., natural rubber or a synthetic substitute, or a leaf spring.

More particularly, the invention provides in combination an axial fluid flow rotor for a turbo-machine, a blade having a root base and a stem extending radially therefrom, means rigidly securing said root base on said rotor against centrifugal force, said means comprising means defining an undercut groove in the rotor adapted to engage an enlargement of said root base or other known securing means, with the stem extending radially of said rotor, a resilient vibration damping member located against the side of said stem and a root projection integral with said root base extending radially therefrom and spanwise of the blade in spaced relation to said side of said stem and retaining the resilient vibration damping member in engagement with the side of the stem to damp vibration of the stem transverse to the direction of fluid flow relative to the blade root base and projection.

The invention is illustrated by the accompanying drawings of which:

Fig. 1 is a view of a ring of blades on a single-stage rotor of an axial-flow compressor;

Figs. 2, 3 and 4 are elevational section, side elevational and plan section views respectively showing in more detail one particular form of the invention, the rotor rim being sectioned in Fig. 3 to expose the base and projection portions of the blade root, while Fig. 4 is in section on 4—4 of Fig. 2 and Fig. 2 is in section on 2—2 of Fig. 3;

Fig. 5 is a view corresponding to Fig. 2 showing a modification;

Figure 6:
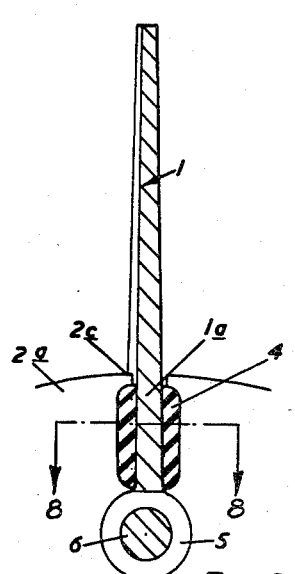
Figure 7:
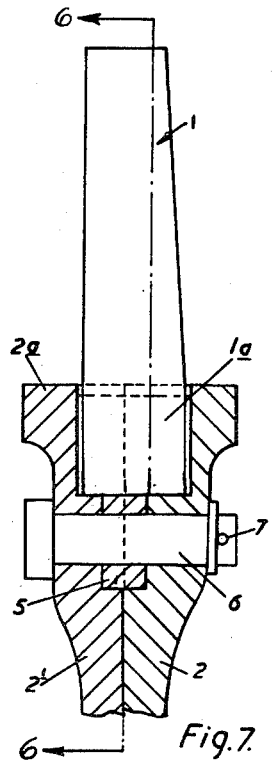
Figure 8:
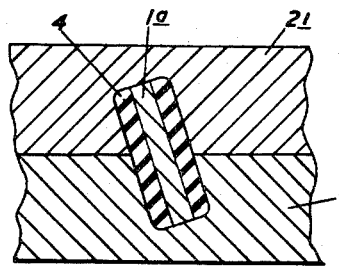

Figures 6, 7 and 8 are views of an alternative embodiment, of which Figure 6 is a sectional view taken on the line 6—6 of Figure 7; Figure 7 is a central longitudinal sectional view of the embodiment shown in Figure 6, taken on a plane at right angles to the plane of the paper and Figure 8 is a cross-section taken on the line 8—8 of Figure 6.

Figure 9:
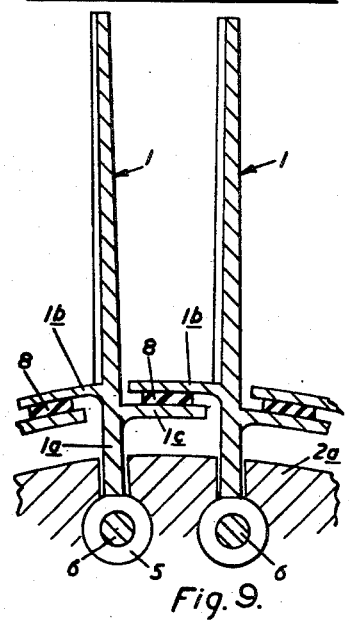
Figure 10:
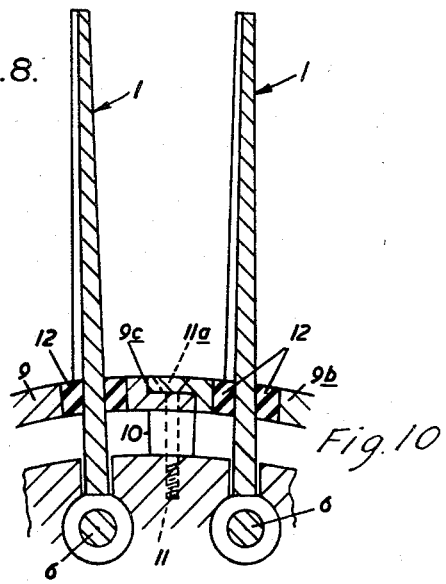

Figs. 9 and 10 are views corresponding to Fig. 6, of two modifications;

Figs. 11 and 12 are views corresponding to Figs. 6 and 7 respectively of another modification;

Figs. 13, 14 and 15 are similar views to Figs. 2, 3, and 4 respectively of yet another form of the invention, and Fig. 16 is a view, corresponding to Fig. 13, of a modification.

In Fig. 1 the blades 1 having stems 1a and root bases such as indicated at 3 are mounted in the grooved rim 2a of a rotor wheel 2 formed in well-known manner by bringing together two wheels 2 and 2¹. The invention is applied to this form of rotor in various different ways as shown in the rest of the figures.

In the particular construction of rotor shown in Figures 2 through 4, each rotor blade 1 has a stem 1a and a root base 3, which is rigidly attached to the rotor 2 by fitting in a deep circumferential groove 2b in the rim 2a on the rotor 2. The root base 3 has root extensions 3c located in the undercut bottom part 2f of the groove 2b. The blade stem 1a arises from the root base 3 with a radially inner portion 1g of the stem 1a lying in the groove 2b and a remaining portion indicated at 1e of the stem extending radially outwards of the rim to form the working part of the blade, the sides of the blade lying at an inclination to the direction of fluid flow.

Each blade root base 3 includes two root projections 3a extending radially outwards from the root 3 in spaced relation to the portion 1g of the blade so as to define the gap 4a between each root projection 3a and the adjacent portion 1g of the stem of the blade 1a. The gaps 4a so formed are filled with a mass 4 of rubber or rubber substitute serving as a resilient vibration damping member between the blade stem 1a and root projections 3a for damping any vibrations of the blade stem 1a bending as a cantilever about its junction with the root base 3, i.e., transverse to the direction of fluid flow. The root projections 3a of adjacent blades abut against each other and their top parts 3b are substantially flush with the top of the rotor rim so that the roots fill the height and circumference of the groove 2b but with the width of the groove slightly greater than that of each blade so as to leave clearance on each side of the ring of blades. The top portion 3b of each root projection 3a is formed as a lip which approaches close to the side of the blade stem 1a leaving only a small clearance so that these top parts together substantially form a cylindrical boundary wall of the working fluid space.

In the above described arrangement the blade with its resilient damping material forms a unit which is completed before it is inserted in the rotor. The rubber or like material may be bonded to the surfaces with which it is in contact. In the modification shown in Fig. 5, the root projections of the blade roots are omitted and the mass 4 of rubbery material, which is inserted when the blades 1 are being assembled on the rotor, extends circumferentially from the face of one blade to that of the adjacent blade in the space within the groove. This arrangement is effective only if the blades do not all vibrate in phase with each other. The boundary wall of the working fluid space is not formed by the top surface of the rubbery material but is shown as formed by a ring made up of segments 9 over the tops of all the masses 4, with clearing holes 9a through which the blades project. These segments 9 are held by screws 11 which are screwed into the rotor.

The root fixing can be of any of the conventional forms for resisting centrifugal force on the rotor blades and it will be understood that the centrifugal and other forces on the fixing are not taken by the resilient material.

In the different construction shown in Figs. 6, 7 and 8, rotor blades are formed in known manner with a root 5 in the form of a circular boss fitting in a recess in the rotor rim 2a and pin-pointed thereto by the headed pin 6 retained by split pin 7; thus the fixing, although it rigidly supports the centrifugal load, leaves the blade free to pivot slightly in the direction in which vibrating forces act. Stem 1a of the blade 1 also lies in a further groove in the rotor rim so that the masses 4 of rubber or rubber substitute can fill the spaces between the sides of the blade stem 1a and the sides of the groove. The periphery of the rotor rim is formed with lips 2e which approach close to the blade, leaving only a small clearance.

Alternatively the mass of rubbery material lies between adjacent blades instead of between blade and rotor body. In the preferred construction of the latter kind shown in Fig. 9 each blade 1 has a platform 1b extending in the circumferential direction of the rotor to one side of the blade overlapping a similar platform 1c extending in the opposite direction from the adjacent blade and a layer 8 of rubber or rubber substitute sandwiched between each two over-lapping platforms 1b and 1c and preferably bonded to at least one of them. The uppermost platforms 1b are separated from the sides of adjacent blades by only a small clearance so that together they form the boundary wall of the working fluid space. The blades are shown as having roots 5 pin-jointed to the rotor rim by pins 6 as already described with reference to Figs. 6 and 7; the lower part 1a projects through the rim 2a of the rotor with a small clearance. The blade roots could clearly however be attached to the rotor by any of the conventional forms of root fixing.

In the modification shown in Fig. 10, the platforms 1b and 1c integral with the blades are omitted. Their place is taken by segments 9b each of which can be threaded over a group of blades in similar manner to the segments 9 of Fig. 5 and which are joined together by overlapping joints at 9c and attached to the rotor rim, for example, through spacers 10 by the screws 11 riveted to a segment at 11a so as to be adequate to hold the segments against centrifugal force; thus these segments make up a ring around the rotor forming the boundary of the fluid path. Each segment 9b has clearance space in a hole or slot around the blade filled with a mass 12 of rubbery material.

In another modification shown in Figs. 11 and 12 the pivot pin is omitted. The blade root 5 now fits in a corresponding part-circular seating in the rotor, after the fashion of an ordinary bulb root; the corners of the rotor space through which the blade projects are cut away at 2a so that the blade as a whole is pivotally free to a small extent. To limit and damp the pivot movement a tongue 13 projects radially inwards from the root 5— on the opposite side of the root from the blade proper— into a groove in the rotor below the blade seating. The recesses constituting the seating and groove are formed partly in each of the two wheels 2 and 2¹ which are brought together to form the rotor wheel. The groove is considerably larger than the tongue 13 to leave a space around the tongue which is filled with a U section mass 14 of rubber or rubber substitute. A platform 1d lying over the rotor rim 2c is between the blade 1 and the root 5. It will be understood that these constructions are also applicable to the mounting of stator blades.

Although in a compressor the temperatures are not unduly high and rubber or like material is permissible, it is preferable to avoid its use. According to a further feature of the invention the resilient members are leaf springs. Thus, in a modification of the first of the above described forms of the invention and shown in Figs. 13, 14 and 15 each blade 1 carries a U-shaped leaf spring 15 on at least one side of the blade in the space between the side of the blade and the root projection 3a of the root base 3 of the adjacent blade. In particular if, as shown, each root base has only one upstanding portion, on one side, the spring 15 will be between the other side of the blade and the root projection 3a of the root of the next blade. If there be no such root projection, then, as shown in Fig. 16 as a modification of Fig. 13, leaf springs 15 may bear against barriers 16 inserted between adjacent springs, to take the place of said root projection. The limbs of the leaf springs which bear against the blade sides may in either case extend beyond the boundary into the working fluid space, as shown and the sides of the blades may be formed with recesses in which the springs lie flush. A portion 15a of the end of the part of the spring 15 which does not bear against a blade may be turned over to form part of the boundary of the working fluid space. The leaf spring can be retained in place against centrifugal force by a peg 17 attached to and extending transversely across the rotor rim through the loop of the U part of the spring.

We claim:

1. In combination, an axial fluid flow rotor for a turbo machine, a blade having a root base and a stem portion extending radially outward from said root base, means rigidly securing said root base on the rotor against centrifugal force, a resilient vibration damping member located against the side of the part of the stem portion of the blade nearest the root base, and a root projection extending radially outward from said root base in circumferentially spaced relation to said part of the stem portion and retaining said damping member in yielding engagement with the side of the blade stem portion to damp vibration of said stem portion transverse to the direction of fluid flow relative to said root.

2. A blade for a turbo-machine comprising a blade stem, a root base integral therewith, a root projection integral with said root base and extending spanwise of said blade and spaced circumferentially from said blade stem and defining a gap between said blade stem and said root projection, and a resilient vibration damping member in said gap bearing against the blade stem and said root projection.

3. A blade according to claim 2, wherein said resilient member is a mass of rubbery material filling the gap between the root projection and the blade stem.

4. A rotor for a turbo-machine, a blade having a blade stem and a root base integral with said stem, means rigidly securing said root base in said rotor against the action of centrifugal force, a root projection integral with said root base and extending radially outward from said root base and spanwise of said blade, said root projection circumferentially spaced apart from and defining a gap with said blade stem, and a resilient member maintained in yielding engagement with said blade stem by said spanwise extending root projection.

5. The combination as claimed in claim 4 in which the resilient member in yielding engagement with the blade stem and the root projection is composed of a mass of resilient material.

6. In combination, an axial fluid flow rotor for a turbo-machine, a blade having a root base and a stem portion extending radially therefrom, means rigidly securing said root base on the rotor against centrifugal force, said root base having formed integrally therewith two radially extending root projections, one of which root projections extends spanwise of the blade on one side of said blade stem in circumferentially spaced relation thereto, and the other of which root projections extends spanwise on the other side of said blade stem in circumferentially spaced relation thereto, and resilient vibration damping members located between each spanwise extending root projection and the adjacent side of said blade stem and yieldingly retained by said root projections in engagement with said adjacent sides of the blade stem.

7. A blade for a turbo-machine comprising a blade stem, a root base integral therewith, a first root projection integral with said root base and extending spanwise of said blade and spaced circumferentially from said blade stem and defining a gap between one side of said blade stem and said first root projection, a second root projection integral with said root base and extending spanwise of said blade and spaced circumferentially from said blade stem and defining a gap between a second side of said blade stem and said second root projection, and resilient vibration damping members located between each of said root projections and the adjacent sides of said blade stem.

References Cited in the file of this patent

UNITED STATES PATENTS

| | | |
|---|---|---|
| 1,554,614 | Allen | Sept. 22, 1925 |
| 2,315,611 | Franck | Apr. 6, 1943 |
| 2,405,283 | Birmann | Aug. 6, 1946 |
| 2,412,615 | Howard | Dec. 17, 1946 |
| 2,436,087 | Benson | Feb. 17, 1948 |
| 2,537,739 | Chilton | Jan. 9, 1951 |
| 2,595,829 | Dean | May 6, 1952 |
| 2,631,680 | Le Compte | Mar. 17, 1953 |
| 2,643,853 | Redding | June 30, 1953 |
| 2,669,383 | Purvis | Feb. 16, 1954 |

FOREIGN PATENTS

| | | |
|---|---|---|
| 554,119 | Germany | July 13, 1932 |
| 595,643 | Great Britain | Dec. 11, 1947 |
| 713,187 | Germany | Nov. 3, 1941 |